United States Patent
Voit et al.

(10) Patent No.: US 11,049,055 B2
(45) Date of Patent: Jun. 29, 2021

(54) DIGITAL HISTORIAN AND DASHBOARD FOR COMMERCIAL COOKERS

(71) Applicant: BLENTECH CORPORATION, Santa Rosa, CA (US)

(72) Inventors: Daniel Voit, Santa Rosa, CA (US); Keith Weerts, Garfield, WA (US)

(*) Notice: Subject to any disclaimer, the term of this patent is extended or adjusted under 35 U.S.C. 154(b) by 113 days.

(21) Appl. No.: 16/564,682

(22) Filed: Sep. 9, 2019

(65) Prior Publication Data

US 2020/0090098 A1 Mar. 19, 2020

Related U.S. Application Data

(60) Provisional application No. 62/731,024, filed on Sep. 13, 2018.

(51) Int. Cl.
G06Q 10/06 (2012.01)
A47J 36/32 (2006.01)
(Continued)

(52) U.S. Cl.
CPC ...... *G06Q 10/06316* (2013.01); *A47J 36/321* (2018.08); *G05B 15/02* (2013.01);
(Continued)

(58) Field of Classification Search
CPC ........... G06Q 10/00–50/00; H04L 1/00–69/00; H04M 1/00–19/00; A47J 9/00–47/00; G05B 1/00–24/00
(Continued)

(56) References Cited

U.S. PATENT DOCUMENTS 9,253,054 B2 2/2016 Maturana et al.
9,363,336 B2 * 6/2016 Lawson ............ G05B 19/4185
(Continued)

OTHER PUBLICATIONS

Cachada et al., Maintenance 4.0: Intelligent and Predictive Maintenance System Architecture, Oct. 25, 2018, 2018 IEEE 23rd International Conference on Emerging Technologies and Factory Automation (ETFA), Turin, Italy, pp. 139-146 (Year: 2018).*

*Primary Examiner* — Alan S Miller
(74) *Attorney, Agent, or Firm* — Craig M. Stainbrook; Stainbrook & Stainbrook, LLP (57) ABSTRACT

An industrial batch production system, including at least one industrial automation device, at least one equipment sensor disposed on and operatively coupled to the industrial automation device to obtain on-line data relating to a batch run, an Internet-enabled local controller in electronic communication with the equipment sensors, a cloud link connecting the Internet-enabled local controller with an Internet-based cloud platform, a central server in the cloud platform configured to receive data from the local controller and running a process historian software program having a time series database, and at least one Internet-enabled device configured to receive manually obtained time-stamped offline data relating to the batch run and to transmit the offline data to the central server independently of the Internet-enabled local controller through a VPN or Ethernet. The central server processes the on-line data and off-line data together to provide automatic processing services to optimize and improve batch run production.

13 Claims, 5 Drawing Sheets

(51) Int. Cl.
  *G05B 15/02* (2006.01)
  *G06Q 30/00* (2012.01)
  *H04L 29/08* (2006.01)
  *G06Q 50/04* (2012.01)
  *H04M 1/72436* (2021.01)

(52) U.S. Cl.
  CPC ....... *G06Q 10/0633* (2013.01); *G06Q 30/016* (2013.01); *G06Q 50/04* (2013.01); *H04L 67/1097* (2013.01); *H04L 67/12* (2013.01); *H04M 1/72436* (2021.01); *G06Q 30/018* (2013.01)

(58) Field of Classification Search
  USPC ................................................ 705/7.11–7.42
  See application file for complete search history.

(56) References Cited

U.S. PATENT DOCUMENTS

| | | | |
|---|---|---|---|
| 9,558,220 B2 | 1/2017 | Nixon et al. | |
| 9,565,275 B2 | 2/2017 | Lawson et al. | |
| 9,588,514 B2 | 3/2017 | Christensen et al. | |
| 10,816,960 B2* | 10/2020 | Asenjo | G06Q 10/06 |
| 10,877,464 B2* | 12/2020 | Chao | G06F 16/907 |
| 2005/0210337 A1* | 9/2005 | Chester | G05B 23/0254 714/47.2 |
| 2007/0019641 A1* | 1/2007 | Pai | H04L 29/06 370/389 |
| 2010/0063611 A1* | 3/2010 | Patel | G05B 23/024 700/108 |
| 2012/0154149 A1 | 6/2012 | Trumble | |
| 2013/0211546 A1* | 8/2013 | Lawson | H04L 67/16 700/9 |
| 2013/0211870 A1 | 8/2013 | Lawson et al. | |
| 2013/0212420 A1* | 8/2013 | Lawson | G05B 19/4185 713/400 |
| 2014/0250153 A1* | 9/2014 | Nixon | G05B 19/042 707/812 |
| 2016/0252895 A1* | 9/2016 | Case | G06Q 50/04 700/12 |
| 2018/0024537 A1* | 1/2018 | Chauvet | G06F 9/4881 718/104 |
| 2018/0253082 A1* | 9/2018 | Asenjo | G06Q 10/06 |

* cited by examiner

Typical (Simplified) Batch Report

BT01 Batch Completion Report

| Step # | Step Name | Procedure Name | Step Time (Min) | Wt. Change (lbs) | Operator |
|---|---|---|---|---|---|
| 1 | Tare Load Cell | RequestInfo | 0.2 | 88 | Bob Vance |
| 2 | Load Water | Check Step | 2.6 | 1400 | Bob Vance |
| 3 | Load Sausage | Material Add | 10.2 | 600 | Bob Vance |
| 4 | Heat Sausage | Heat | 12.3 | 0 | Bob Vance |
| 5 | Add Butter, Spices | Hand Add | 4.89 | 925 | Bob Vance |
| 6 | Prepare Starch Slurry | Mix | 7.31 | 800 | Bob Vance |
| 7 | Transfer Slurry | Transfer | 4.5 | 2200 | Bob Vance |
| 8 | Heat to 200F | Heat | 3 | 700 | Bob Vance |
| 9 | QA Check | Branch | 7.34 | 0 | Bob Vance |
| 10 | Discharge | Transfer Out | 10 | -6713 | Bob Vance |

DIGITAL HISTORIAN AND DASHBOARD FOR COMMERCIAL COOKERS

CROSS REFERENCES TO RELATED APPLICATIONS

The present application claims the benefit of the filing date of U.S. Provisional Patent Application Ser. No. 62/731,024, filed Sep. 13, 2018 (Sep. 13, 2018).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention

Industrial food production (particularly tertiary food processing) is powered primarily by basic stainless-steel production equipment that enables high volume preparation, mixing, cooking and cooling of foods. Large scale equipment in such industrialization increases the output and enables economies of scale. With the recent increases in the number of small, start-up food processing companies, public awareness of the need for uncontaminated food has correspondingly increased, as have regulatory requirements for food security and food safety. Yet industrial technology lacks the features needed to meet regulatory safety requirements while satisfying many other market demands, including food quality for the consumer and profitability for the producer.

Optimal system performance requires data acquisition, and data acquisition in the industrial setting typically entails capturing, collating, and analyzing a history of data to correlate optimal performance with system conditions. At present, data collection and historian systems fall into a few broad categories. These include: human-based information collection systems, such as manual inspection and logging; online "chart" style recorders that continuously collect one or two key variables such as temperature; and PLC or local computer systems connected to a local historian system (typically server-based and PLC or local computer systems connected to a cloud-based historian system) that continuously collect data across a few key mapped parameters. In practice companies often use a combination of these systems, and each system is inherently disconnected from the others.

To meet regulatory requirements for safety as well as business productivity objectives, these human-computer hybrid systems are used by small and medium processors to track, control, and optimize production. By contrast, large scale food processors design, install, and program custom server-based systems for monitoring and controlling their food processing systems. Operational conditions in processing facilities are automated, often in isolated "islands," and although automation has increased in recent years, that automation generally relies on a few key principles and incorporates a few key features: (1) critical quality or safety parameters are collected offline as required for FDA and USDA Hazard Analysis and Critical Control Points (HACCP) compliance; (2) human intervention is employed for decision-making based on sensory assessment of the foods in process; (3) loading and unloading is done manually; and (4) disconnected unit operations are designed with a unit option in mind as opposed to line optimization or food safety data collection.

The result of these principle and features is that collected data are largely limited and often incorrect as a result of human error. This occurs for the obvious reason that humans are imperfect and also because historian software systems are developed in isolation from food processing equipment and are supplied to 'piggy back' onto existing PLC or DCS control systems. They work by continuously aggregating information collected from the local industrial device. In the food industry this often includes information relating to temperature, motor speed, and other core parameters. The information adds value and is indeed quite useful. The assumption is that the information collected by the local industrial device is adequate for evaluation for all purposes. While this may be true in many cases, it is not true in all cases—namely in food safety and batch production optimization systems.

For continuous production systems, on the other hand, the existing technologies offer significant advantages because a continuous stream of data can easily be correlated and compared to evaluate the causes of problems that persist in those environments. Thus, businesses can confidently adopt and apply systems designed for the continuous collection of data. On the other hand, with respect to use in connection with batch processes, they are of limited value. This is because critical pieces of information and partitioning of the data are simply not collected because the local industrial devices are not structured with the end use in mind. The result is that engineering, quality, and food safety teams often spend hours evaluating data, hoping to understand the operational effects of changes, all with the goal of improving their performance. Unfortunately, the evaluation of online continuously collected data acquired in a batch processing environment is based on a false premise, which may thus mislead evaluation and management teams, and this is costly to businesses. Stated simply, online continuously collected data is not aggregated in a form suitable for rapid evaluation; it does not anticipate the kinds of queries that producers will need to make. Thus, the cost is high to both the processor and the vendor to quantify and assess the impacts using online continuously collected data as a guide.

Systems that rely on manual recordation and collection of information via data forms have outcomes that are still more unreliable and the situation more limited. Human error is not insignificant, and there are numerous other factors adversely affected by direct human involvement in the processes.

In addition, systems in operation at present are unable to aggregate and compare offline data, such as visual inspection results, and thereafter track changes, quantify the completion of the manual intervention steps, and then correspondingly correlate quality with operational conditions. This significantly limits the ability of management groups to optimize quality or performance, and the result is lost production time and reduced food quality and food safety.

To practice lean manufacturing while complying with FSMA (Food Safety Modernization Act) or CE (Conformité Européene) style regulations, a manufacturer must have detailed information about all factors that affect productivity, quality and even safety. In large scale food processing, this is particularly critical because health and human safety is not optional. Thus a basic breakdown is required for each step of a batch process, comparing different batches of the same product and preferably comparing different batches prepared by different operators, teams, and ingredient suppliers.

Systems to aggregate information collected online as well as offline, designed with the end use in mind and avoiding the need for a local server system have not previously been developed and deployed. The ability to collect and correlate data at the appropriate moment in a process enables capabilities simply impossible with any existing framework. For example, mobile phone photos taken a fixed distance and lighting enable to the tracking of particle size reduction or increase during a process while the same data can be used in infrared to assess completeness or cook or distribution for completeness of a blend by color analysis. While local server systems have been developed for industrial use that perform some similar operations, these systems require significant time and expense to design, build and install. This is due to the cost of hardware as well the limited availability of personnel skilled in the configuration of such systems.

Discussion of Background Art

At present, there are no known systems that enable a cloud-based historian system to integrate with a batch unit operation to collect both the online and the offline data required for optimization, quality assurance, and product safety.

Lawson (U.S. Pat. Appl. Pub. No. 2013/0211870) describes real time product tracking using a cloud platform. The system is principally designed to connect to existing equipment or equipment system to collect data generated from a supply chain system for evaluation in the cloud. The system relies on one or more sensors within a processing, packaging or handling system, to collect data from the sensors, correlate the data to infer opportunity for improvement, and generate recommendations. The system, inherently designed for continuous production, processing or handling, does not allow the collection and correlation of both online and offline collected data. Further, the system does not provide productivity or efficiency metrics, which are required for an evaluation of a process within a unit operation as such metrics relate to quality, safety or productivity. This type of system, though elegant in its description, cannot be retrofitted or installed easily on existing or legacy systems because of the very nature of the information collected on the systems. The present invention, by contrast, focuses on a single machine or system of machines and their interrelated recipe steps. It collects, correlates, and makes recommendations using a different structure and information transfer technique for both online and offline data, enabling more complex and challenging decisions about quality, safety and productivity.

Maturana, et al. (U.S. Pat. No. 9,253,054) teaches a remote industrial monitoring system with analytics using a cloud infrastructure. The system is an agent-based communications channel that facilitates gathering, transmitting, and remote storage of control and automation data. The system focuses on control and automation data collected online by the industrial devices. In furtherance of that end, Maturana outlines an elegant architecture for data collection and transference systems that have been used in industrial automation and information transfer from site to server for decades. However, it materially differs from the present invention insofar as the instant invention does not rely on an analytics framework to function. Rather, it enables the input of manually measured quality parameters to ensure HACCP and FISMA compliance by the local industrial device, or at the cloud level in the case of a system of distributed industrial devices, as when serving restaurants with commercial kitchens operating regionally.

Lawson et al. (U.S. Pat. No. 9,565,275) describes a system to reduce the consumption of cloud-based resources to optimize resources such as bandwidth. The system operates with a component that communicates with the industrial automation device via a web-based cloud, receiving a request from the cloud-based application to append key pieces of information with metadata. This information may include tags such as a site location or production area. The cloud-based server employed in the present invention does not request any transformation of raw data or the addition of metadata to the data sent to the cloud server. Instead, all location metadata is added at an industrial automation device (cloud interface component) when the system is commissioned. The identity of the product being produced is automatically part of the data payload and is not a response to a request from a web-based application. The data being sent is not refined in response to requests from an application running in the cloud. Moreover, unlike the data package of the system described by Lawson, the data package of the present invention is set and not mutable. The inventive system thus works in a fundamentally different way: it collects all the data there is to collect and then responds based on observations at the cloud level. Certain alarms trigger messages to the user or to the system provider, but this does not require the addition of contextual data to better identify the data. Rather, the data is identified by the data in the package. Since Lawson et al is based entirely upon the need to append data with contextual metadata from a cloud-based application, it is inherently is unable to obtain the same segmentation and specificity of information obtained via the present invention, which tags the information at the time of creation and combines offline data for evaluation and comparison enabling evaluation for a broader set of considerations.

A second feature of the Lawson system is that it requires special steps to minimize bandwidth when very large sets of data are collected. In the present invention, by contrast, the system limits the data that must be collected by carefully selecting the information needed prior to control system design. As a result the inventive system typically transfers less than 100 unique tags of information from any machine and requires no special efforts to minimize bandwidth. Lastly, the inventive system partitions and associates data that cannot be associated with any current analysis, including the association of quality information taken offline Trumble (U.S. Pat. Appl. Pub. No. 2012/0154149) discloses an automated fault analysis and response system. This teaching is directed to a system that measures tolerance at the completion of a step for a multi-step manufacturing operation, such as machining, and it uses a regression analysis to assess which of the multiple steps are responsible for an error. The system is designed for automatic root cause analysis.

The inventive system, by contrast, compares online data generated by plant equipment and offline data generated by inspectors and operators against quality and safety parameters and prevents the advancement to a subsequent step. In embodiments, a root cause analysis is unnecessary because the root cause is identified on the step at the time a deviation occurs, thus resulting in reduced waste.

Christensen, et al (U.S. Pat. No. 9,588,514) describes a commissioning field device in a process control system supported by big data. The system provides a method to determine a process element alignment, which automatically determines the order of multiple field devices within a process. The system does not incorporate information collected both digitally as well as manually, nor does it allow comparisons of quality parameters. It also cannot be applied to batch processes because the order of device placement is non-linear in a batch unit operation.

The foregoing patents reflect the current state of the art of which the present inventors are aware. Reference to, and discussion of, these patents is intended to aid in discharging Applicants' acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein. Specifically, and to reiterate, the foregoing patents do not describe systems that enable a cloud-based historian system to integrate with a batch unit operation to collect both the online and the offline data required for optimization, quality assurance, and product safety. There is, therefore, a need in small to large scale tertiary food processing for such a system.

BRIEF SUMMARY OF THE INVENTION

The inventive digital historian and dashboard for commercial food processors is set up as a central server in a Gateway Area Network (GAN). The system 10, shown in summary form in FIG. 1, collects data from all food processing systems in operation. Through high CPU availability, it fully exploits and leverages the inferior capabilities of a PLC-based system. In embodiments it is a platform that interfaces with a cloud system, thereby enabling reduced costs of deployment, configuration, and maintenance.

Figure 1:
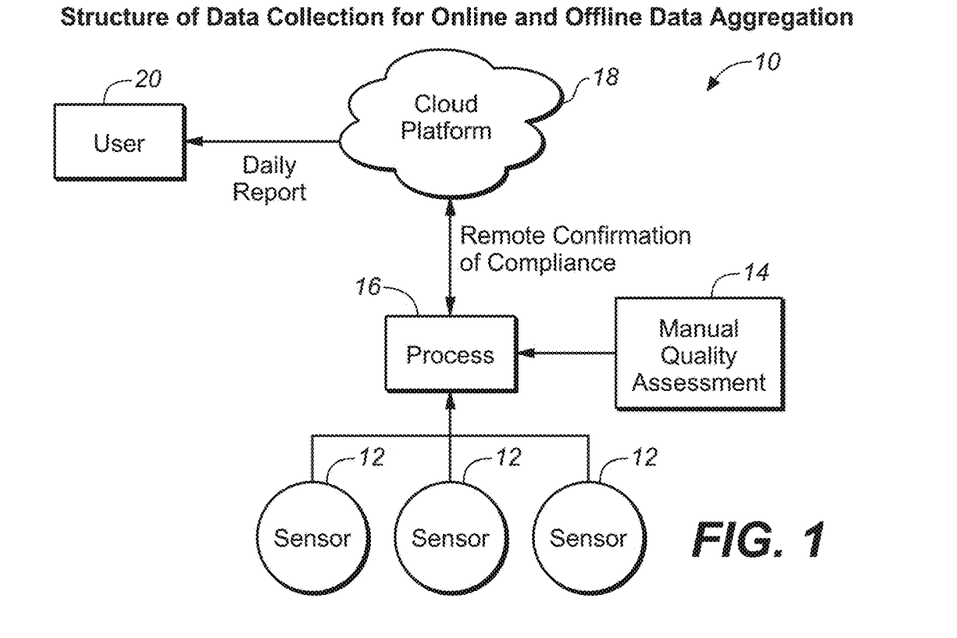
FIG. 1 is a schematic flow chart showing the structure of data collection for online and offline data aggregation of the cloud-based digital historian for commercial cookers of the present invention.

The inventive system 10 incorporates an industrial automation device having one or more sensors 12, and an automatic recipe sequencer, and it prompts for the manual input of offline collected quality assessment data 14. The information is processed by a controller 16 at the local level, and the data are then transmitted to a cloud platform 18, which provides capabilities to the user 20 not available on any other known invention or commercially available product. A non-exhaustive list of such capabilities may include: remote recipe editing and distribution; customized batch reporting for each customer at the completion of each batch run; dashboard generation for use by each customer to review ongoing and historical batches; notifications across communication platforms, such as mobile, email, SMS and other notification systems as needed; AI review of recipes as they are being built and suggested improvements; AI anticipation of probable process time for a configured recipe to anticipate production time using historical and theoretical data sets; daily report generation summarizing a day's runs, along with data relating to other non-batch related events (RTD calibration, vacuum tests, etc.); statistical comparison of steps with theoretical or observed data sets to determine outliers and their potential cause; supply of data to a cloud service to assist customers in optimizing recipes for maximum throughput and quality; generation of emails to a cloud service, notifying the customer when a remote gateway has lost connection to the GAN and when the connection is re-established; generating messages (email, text, or voice) to a designated user at the customer location based on alarm status, HACCP issues, or run status (e.g., batch started, batch in hold, expected batch completion time, batch completed); sending data to other customer assets (packaging, ERP, etc.) to improve productivity; monitoring equipment wear, recommending the replacement and servicing of parts based on hours of use or other indicators (torque change, vibration, etc.); enabling a cloud service to share the customer's screen to assist the user and to recognize when the user experience needs improving; and using the GAN to update all remote gateways (screens modified, software updated, and so forth).

Local capabilities include the ability to input offline collected data, which can in turn be compared and correlated with online collected data sets. Using the inventive system, it is also possible to adjust and alter recipes to suit changing conditions as they relate the dynamic factors such as incoming temperature, latent heat, quality, or utility supply.

Comparisons and notifications are generated and reside at the cloud level 18. The aggregated data, partnered with theoretical calculations, enables the projection of new recipe completion times in a recipe configurator. The projected completion times enable optimization of new recipes to best suit the order of operation and or conditions that optimize quality, safety and productivity.

In embodiments, the present invention provides a more secure remote support and service platform. Although a large portion of the system can be remotely supported via the GAN, currently deployed software requires a Windows-based computer running remotely over a VPN or locally on a VM to modify PLC code. Remote support also enables custom changes to the HMI and to manage the customer's food processing system database.

Remote service operations include numerous tasks: code updating, especially the addition of new features that can be sold to customers; adding extra recipe capacity and other features to a customer's food processing system; fine tuning parameters to customize a system to a customer's utilities; and remote startup support (thereby allowing system starting without having controls personnel onsite).

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF SEVERAL VIEWS OF THE DRAWINGS

The invention will be better understood and objects other than those set forth above are apparent when consideration is given to the following detailed description thereof. Such description makes reference to the annexed drawings wherein.

DETAILED DESCRIPTION OF THE INVENTION

The cloud computing system of the present invention is a dispersed computing system that centralizes resources located in traditional cloud computing structures. The system collects the operational information critical for safe, efficient, and nutritious food production from batch run systems. It does so at fractions of the cost of custom built industrial systems. The system is suited for use by small scale to large scale food processors, thus helping them comply with federal and state regulations, such as FSMA.

Figure 2:
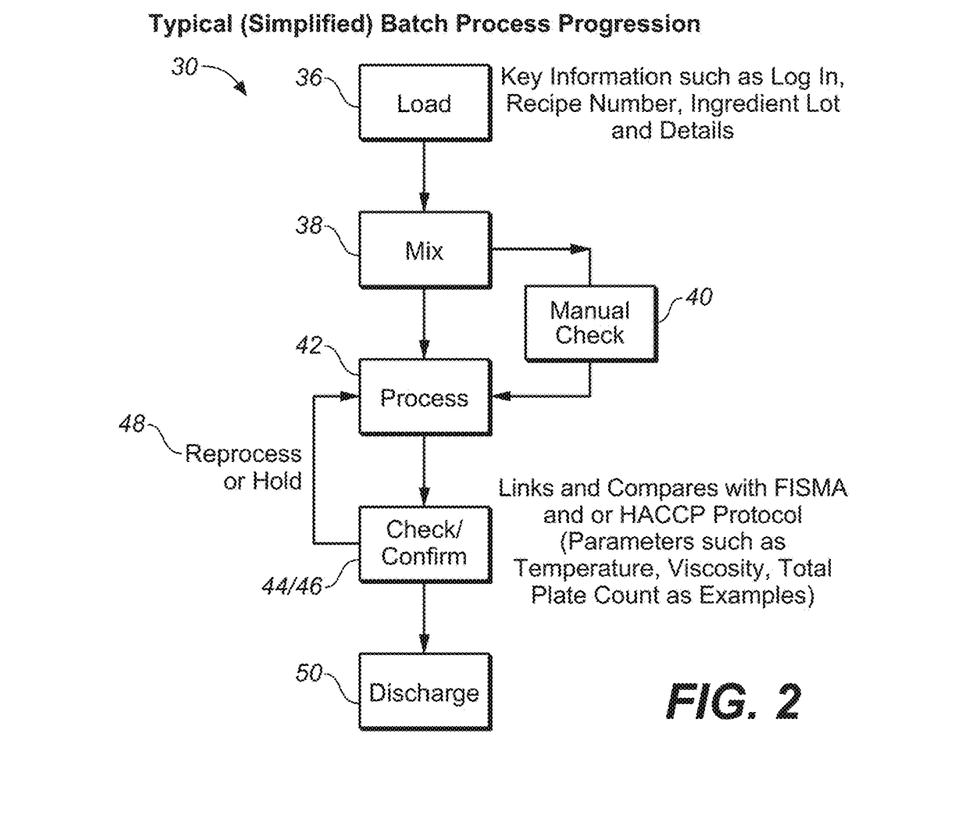
FIG. 2 is a schematic view of a sample batch recipe configuration and progression that includes Equipment Module and manual steps.

The batch control structure involves, as an initial step, the practice of designing a recipe structure using a combination of automatic and manual steps, using messaging systems such as auditory, visual, and SMS where needed, to ensure operators are responsive. Typical recipes are assembled using a defined set of equipment modules (EM) arranged to run in sequence or in parallel when multiple devices are present. FIG. 2 provides an example of a recipe configuration 30 consisting of EM and steps, and might include the following:

<Automatic Load Water> 32
<Manual Load Ingredient A> 34
<Key in batch information, such as log in, recipe number, ingredient lot, etc.> 36
<Mix for time> 38
<Manual check with quality entry> 40
<Thermal Process to measured temperature> 42
<Manual confirmation of temperature with confirmation entry> 44
<Manual confirmation of pH with manual entry> 46
<Reprocess or hold as needed> 48
<Repeat checks/confirmations 44/46 as needed>
<Discharge product when FSMA/HACCP parameters/ protocols met> 50

Quality entries might include such things as: a photograph from a smart phone attached to the batch record; an offline measurement of pH, viscosity or sensory analysis; critical HACCP parameters; and operator notes.

The processes and system apply to the batch processing and equally to the automatic "Clean in Place" or CIP systems often included on batch systems. This enables the collection of critical cleaning data.

The information automatically collected is easily configured, because EM modules can be added, revised, or updated remotely. A partial list of typical information collected includes: (a) Time of Day; (b) operator Logged in (ID) (c) manual notes or measurements (compared against approved boundaries for safety or quality parameters); (d) raw material sources and weights; (e) calibration frequency for online and offline devices; (f) temperature; (g) time; (h) pressure; (i) viscosity; (j) conductivity; (k) steam quality; (l) turbidity; (m) speed or pumps; (n) agitation used; (o) torque/power output; (p) add gate, valve, pump and door states; (q) all device conditions segmented by step, EM and batch; and (r) final product quantity produced.

Because the information identified in the immediately preceding paragraph is automatically collected, automatic comparisons are enabled by the cloud computing system, such comparisons including: (i) Comparison of efficiency batch to batch across time (ii) comparison of operator efficiency batch to batch across time; (iii) comparison of quality to batch operation conditions; (iv) comparison of quality to raw material lots; (vi) automatic identification and notification of primary factors limiting performance; (vii) automatic identification and notification for conditions differing from typical operational conditions; (ix) predictive calculations for completion time and overall efficiency factor; (x) automatic notification to management structures for quality or food safety deviations; (xi) projection of OEE compared with standard operating conditions; (xii) totalized production and yield calculation; and (xiii) AI adjustment of operational parameters to improve system performance.

Figure 3A:
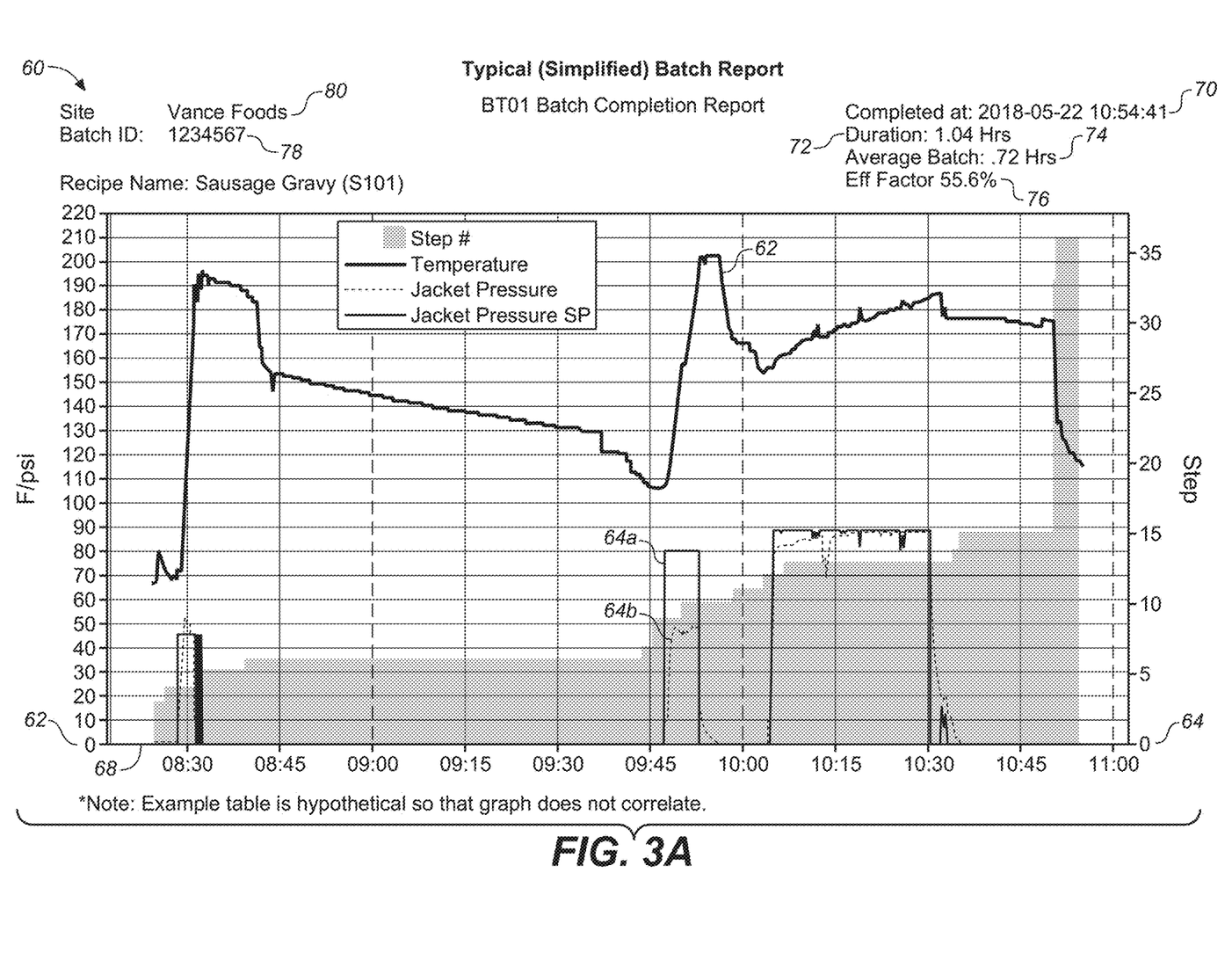
FIG. 3A is a simplified batch completion report graph mapping several operational parameters.
Figure 3B:
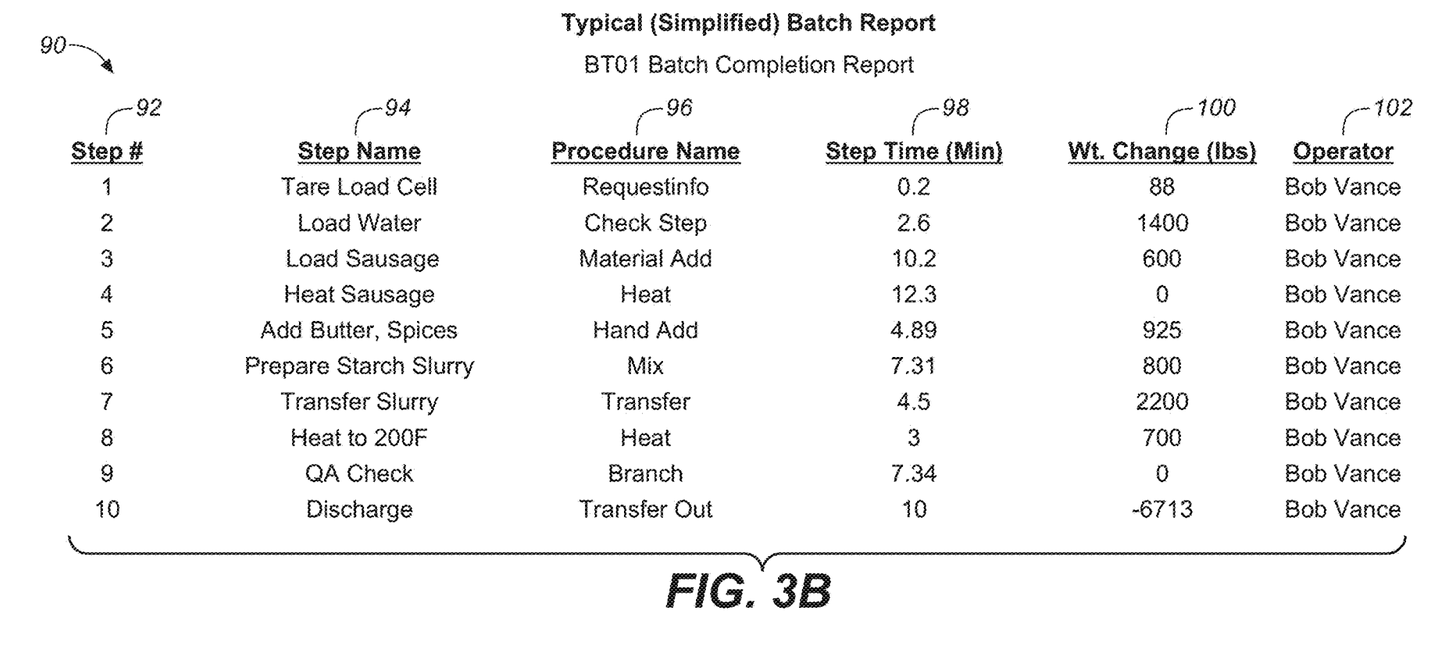
FIG. 3B is a hypothetical data table supporting for a simplified batch report (thus, which does not correlate to the table)

The information is processed at the local level on the controller, and data is transferred to the cloud storage where it is evaluated and compared. This data is then displayed in a user dashboard, and optimized via the EM and in steps provided for each user. A greatly simplified batch report 60 (see FIGS. 3A-3B) includes graphic and tabular data in embodiments and is designed to enable optimization of recipe steps by reducing time to complete each stage. As FIG. 3A shows, the system may track and correlate cooking temperature 62 against jacket pressures 64/66a/66b, by time 68. The report reflects the date and time completed 70, the process duration 72, the batch average cooking time 74, the efficiency factor 76, the recipe by name and code number 78, and the production site 80. Corresponding tabular data 90, an example of which is shown in FIG. 3B, set out the step numbers 92, the step names 94, the procedure name for each step 96, the time required to carry out the step 98, the change in product weight as a result of carrying out the step 100, and the operator name 102.

Figure 4:
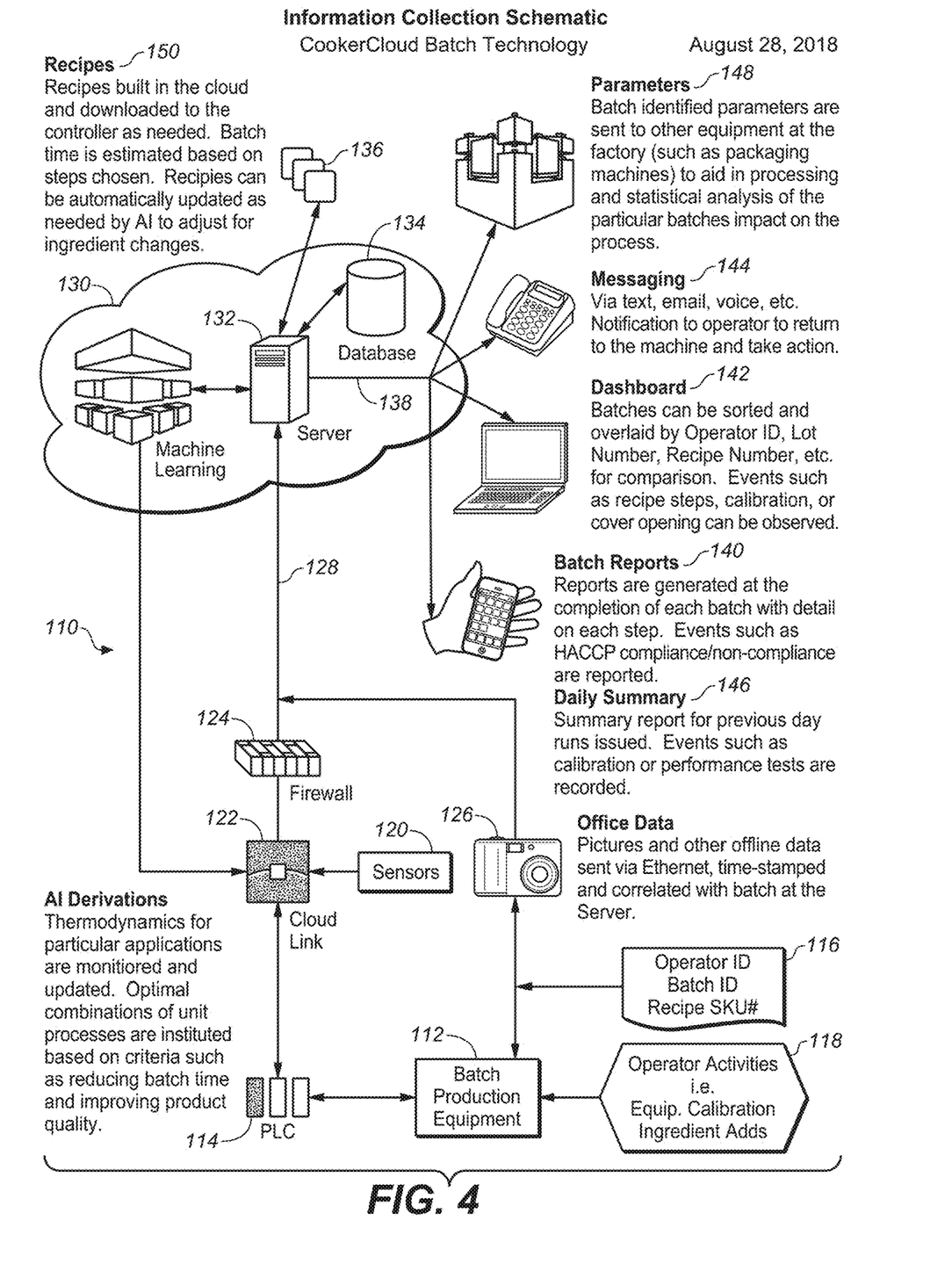
FIG. 4 is a highly schematic system information collection chart.
Figure 5:
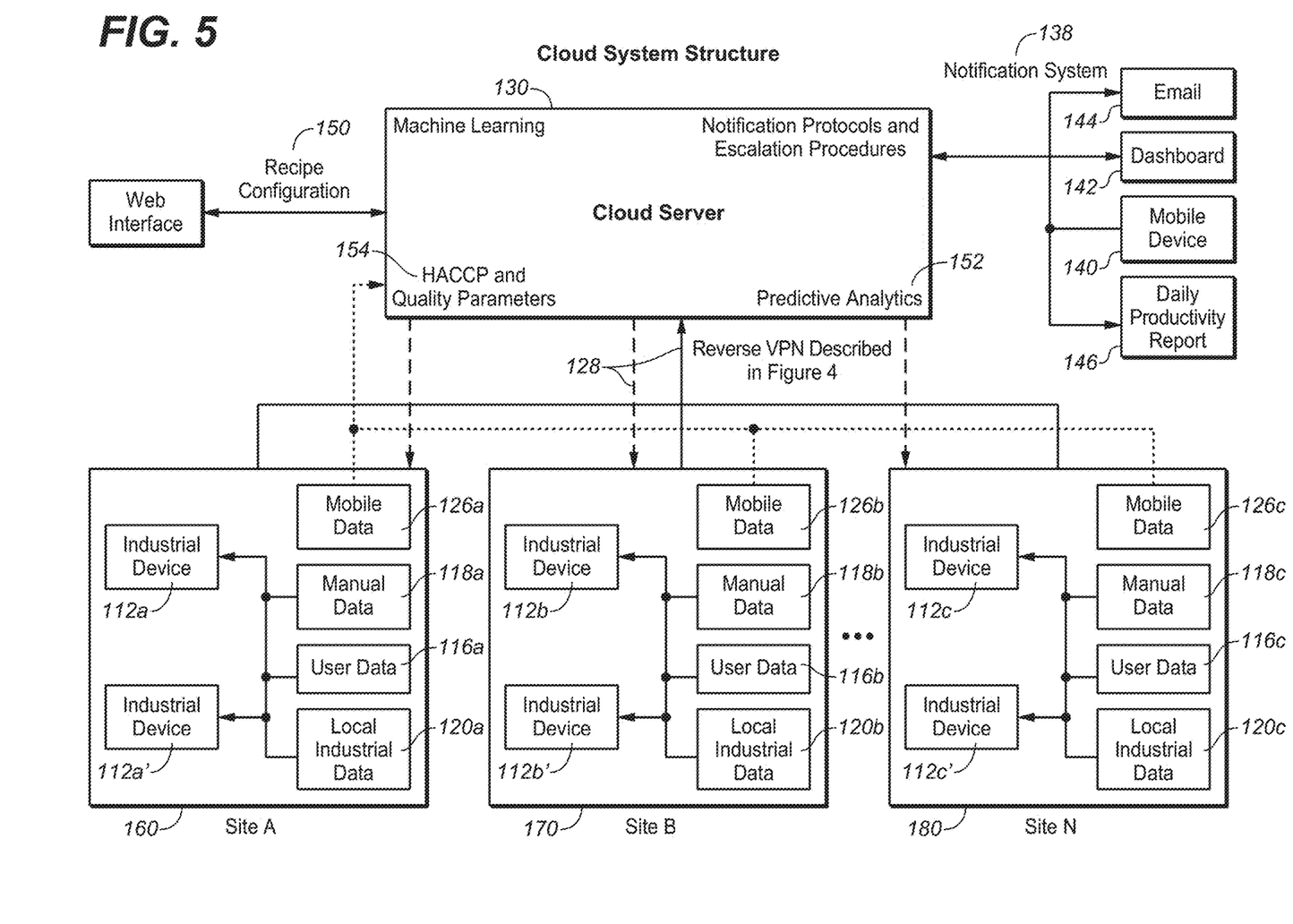
FIG. 5 is schematic chart showing the cloud system structure of the digital historian of the present invention.

In embodiments, and referring now to FIGS. 4-5, the digital historian and dashboard for commercial food processors 110 includes, at the level of the food processing enterprise, one or more instances of batch industrial food processing equipment 112 (mixers, handlers, loaders, marinators, cookers, coolers, etc.) controlled by a PLC or other equipment controller 114 that enables a user to log in and input batch data 116, and to initiate pre-process activities, such as equipment calibration and ingredient additions 118. Equipment sensors 120 provide online data to the cloud platform via a cloud link 122. A system firewall 124 prevents unauthorized access to the local system and production equipment while allowing the transmission of online data to the cloud platform. Time stamped offline data 126 may also be transmitted to the cloud platform via Ethernet or by via a reverse VPN tunnel 128.

The cloud platform 130 includes a cloud server 132 and database 134 for recording, storing, and aggregating equipment operational conditions and performance. The server includes a processor and programs which, when executed, may include such capabilities as: remote recipe editing, building, and distribution 136, including downloading and updating the recipes to the controller 114 via the cloud link 122; and using machine learning to automatically update and adjust for ingredient changes; a notification system 138 that generates customized batch reporting 140 for each customer at the completion of each batch run; dashboard generation 142 for use by each customer to review ongoing and historical batches; notifications across communication platforms, such as mobile, email, SMS and other notification systems as needed 144; daily report generation 146 summarizing a day's runs, along with data relating to other non-batch related events (RTD calibration, vacuum tests, etc.); statistical comparison of steps with theoretical or observed data sets to determine outliers and their potential cause 148; AI review of recipes as they are being built and suggested improvements 150; AI anticipation of probable process time for a configured recipe to anticipate production time using historical and theoretical data sets 152.

The system is programmed with escalation procedures included 154. As quality data are analyzed and HACCP compliance evaluated, this allows first the automatic notification of a quality assurance manager with requirements when quality data or HACCP data points are not met. This novel feature creates a digital confirmation of compliance with automatic notification which does not existing in modern batch food production. Since data is input regarding quality parameters measured both online and offline, conditions are compared against known HACCP parameters in the cloud and notifications are enabled as needed to ensure products are reprocessed or held as needed to remain compliant with regulatory process filings.

Other capabilities, again not exhaustively set out, include supplying data to a cloud service to assist customers in optimizing recipes for maximum throughput and quality; generating of emails to a cloud service, notifying the customer when a remote gateway has lost connection to the GAN and when the connection is re-established; generating messages (email, text, or voice) to a designated user at the customer location based on alarm status, HACCP issues, or run status (e.g., batch started, batch in hold, expected batch completion time, batch completed); sending data to other customer assets (packaging, ERP, etc.) to improve productivity; monitoring equipment wear, recommending the replacement and servicing of parts based on hours of use or other indicators (torque change, vibration, etc.); enabling a cloud service to share the customer's screen to assist the user and to recognize when the user experience needs improving; and using the GAN to update all remote gateways (screens modified, software updated, and so forth).

The system is configured and its use in multiple plants 160, 170, 180. Local capabilities at each plant include the ability to input offline collected data 126a, 126b, 126c, which can in turn be compared and correlated with online collected local industrial data sets from system sensors 120a, 120b, 120c on the industrial equipment 112a/112a', 112b/112b', 112c/112c'. Using the inventive system, it is also possible to adjust and alter recipes to suit changing conditions as they relate the dynamic factors such as incoming temperature, latent heat, quality, or utility supply.

Comparisons and notifications are generated and reside at the cloud level. The aggregated data, partnered with theoretical calculations, enables the projection of new recipe completion times in a recipe configurator. The projected completion times enable optimization of new recipes to best suit the order of operation and or conditions that optimize quality, safety and productivity.

In embodiments, the present invention provides a more secure remote support and service platform. Although a large portion of the system can be remotely supported via the GAN, currently deployed software requires a Windows-based computer running remotely over a VPN or locally on a VM to modify PLC code. Remote support also enables custom changes to the HMI and to manage the customer's food processing system database.

Remote service operations include numerous tasks: code updating, especially the addition of new features that can be sold to customers; adding extra recipe capacity and other features to a customer's food processing system; fine tuning parameters to customize a system to a customer's utilities; and remote startup support (thereby allowing system starting without having controls personnel onsite).

At scale, the cloud server system enables the collection and correlation of data sets across locations, no matter the distance. FIG. 5 illustrates the cloud system structure at scale. The unique feature of collection of data online and offline as well as the correlation of industrial data via mobile phone such as photographs used for color analysis or confirmation infrared cameras is unique and novel.

The primary recipe management procedure is located on a web-based portal. In this, the system enables an administratively authorized user to adjust recipes from a desktop computer, a mobile phone or any other internet enabled device. Recipe changed are tracked and comparison across revs and sites is enabled. Back up or restoration of the local recipe data is also possible.

As will be seen from the foregoing, in its most essential aspect, the inventive cloud-based computing and storage system includes an integrated local control system configured to prepare a combination of automatically sensed data and manual data to provide the following functions: (1) collecting data in a batch-oriented step-based file that continuously captures data in a tag historian; (2) collecting, reviewing, and approving online and offline data and operating conditions enabling the real time quality control of for production of batch products; (3) web-based recipe configuration system consisting of both manual intervention steps, automatic steps and hybrid steps; (4) collecting data in an SQL database allowing for quick translation to new languages enabling communication across multiple geographic regions; (5) receiving input from a Cloud AI (Predictive Analytics) system to predict step time and batch time during a run; (6) guiding branch steps that require an intelligent decision, such as extending cook time to thicken product or add water to thin product to meet specifications.

In another aspect, the invention may be characterized as a system for automatically generating a daily report for network connected commercial food processing equipment consisting of production data segmented for daily evaluation of production performance with performance metrics compared against like products based on recipe type and operator. The daily report compares performance of a particular formulation or recipe against theoretical production capabilities and actual results observed providing performance metrics.

In still another aspect, the inventive system may be seen to comprise a web-based batch recipe configuration platform which: (a) synchronizes recipes steps and settings across one or multiple locations; (b) saves copies of previous recipe configurations; (c) allows restoration of previous recipe configurations; (d) retains record of user changes and location of changes; (e) shares recipes between industrial devices in a single location and or in multiple locations; (f) makes AI-based recommendations for process conditions based on ingredients chosen; and (g) estimates batch production time based on recipe steps chosen and statistical data collected from the customer.

The system employs a secure remotely-enabled reverse VPN portal to enable on-demand remote service to an industrial device. This remote access and security system for cloud computing provides a more secure, more robust on demand remote service capability.

The aggregation and collection of data collected both within the industrial device, on the same network as the industrial device, entered from offline manually or collected via a mobile device and sent to the cloud server for time stamp correlation.

The system compares observed operational conditions from online and offline against input HACCP conditions and provides automatic notification to users across mobile, email and other messaging services. The system predicts and projects time to complete a batch production in process and displays a countdown required prior to the initiation of a next stage. The system tracks hours in operation and provides notifications to users or other designated persons any deviations from normal operational conditions or when exceeding recommended hours between service. The system projects the amount of direct steam injection addition water as well as vacuum cooling surplus water required for batch processing based on theoretical and or actual results. Finally, but not exhaustively, the system projects the time to complete a recipe using a combination of theoretical and historical data during the configuration step.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. An industrial batch production system, comprising:
   at least one industrial automation device;
   at least one equipment sensor disposed on and operatively coupled to said at least one industrial automation device to obtain on-line data relating to a batch run;
   an Internet-enabled local controller in electronic communication with said at least one equipment sensor;
   a cloud link connecting said Internet-enabled local controller with an Internet-based cloud platform;
   a central server in said cloud platform configured to receive data from said local controller, said central server running a process historian software program having a time series database; and
   at least one Internet-enabled device configured to receive manually obtained time-stamped offline data relating to the batch run and to transmit the offline data to said central server independently of said Internet-enabled local controller through a VPN or Ethernet;
   said central server processing the on-line data and off-line data together to provide processing services selected from the group consisting of: remote recipe editing and distribution; customized batch reporting for a plurality of customers at the completion of batch runs; dashboard generation for use by customers to review ongoing and historical batches; notifications across communication platforms, such as mobile, email, SMS and other notification systems; review of recipes and suggestions for improvement; anticipation of probable process time for a configured recipe to anticipate production time using historical and theoretical data sets; daily report generation summarizing runs and data relating to other non-batch related events; statistical comparison of steps with theoretical or observed data sets to determine outliers and their potential cause or causes; supply of data to a cloud service to assist customers in optimizing recipes for maximum throughput and quality; generation of emails to a cloud service, notifying a customer when a remote gateway has lost or gained connection to the network; generating messages to a designated user at a customer location based on alarm status, HACCP issues, or batch run status; sending data to customer assets to improve productivity; monitoring equipment wear, recommending equipment and parts replacement, and servicing of parts based on hours of use or other indicators; enabling a cloud service to share a customer's screen to assist the user and to recognize when the user experience needs improving; and using a gateway area network to update all remote gateways.

2. The system of claim 1, wherein said local controller includes a user interface and prompts a user for the manual input of offline collected quality assessment data.

3. The system of claim 2, wherein said central server correlates manually input offline data with online collected data sets.

4. The system of claim 3, wherein said central server outputs recommendations on how to adjust and alter recipes to suit changing conditions as they relate dynamic factors, including temperature, latent heat, quality, or utility supply.

5. The system of claim 3, wherein said central server makes comparisons and generates notifications utilizing aggregated online and offline data coupled with theoretical calculations to project new batch recipe completion times.

6. The system of claim 5, wherein said central server collects operational information critical for safe, efficient, and nutritious food production from batch run systems so as to ensure optimal quality and efficiency while simultaneously ensuring compliance with federal and state food safety regulations.

7. The system of claim 1, wherein a batch control structure is initially established using a defined set of equipment modules arranged to run in sequence or in parallel when multiple devices are present.

8. The system of claim 7, wherein said recipe configuration is directed to industrial food processing and includes steps selected from the group consisting of automatic load water, manual load ingredient, key in batch information, mix for time, manual check with quality entry, thermal process to measured temperature, manual confirmation of temperature with confirmation entry, manual confirmation of pH with manual entry, reprocess or hold as needed, repeat checks/confirmations as needed, discharge product when FSMA/HACCP parameters/protocols met, and combinations thereof.

9. The system of claim 1, wherein offline data entries are quality entries selected from the group consisting of photographs from a smart phone attached to the batch record; pH measurements, viscosity or sensory analysis, critical HACCP parameters, and operator notes.

10. The system of claim 1, wherein online data is automatically collected from a plurality of equipment modules and is selected from the group consisting of (a) time of day; (b) operator ID (c) manual notes or measurements; (d) raw material sources and weights; (e) calibration frequency for online and offline devices; (f) temperature; (g) time; (h)

pressure; (i) viscosity; (j) conductivity; (k) steam quality; (l) turbidity; (m) speed or pumps; (n) agitation used; (o) torque/power output; (p) add gate, valve, pump and door states; (q) all device conditions segmented by step, EM and batch; (r) final product quantity produced; and (s) combinations thereof.

11. The system of claim 10, wherein said central server automatically outputs information displayed on a user dashboard on said local controller or on a network-enabled device, the output information selected from the group consisting of: (i) comparison of efficiency batch to batch across time (ii) comparison of operator efficiency batch to batch across time; (iii) comparison of quality to batch operation conditions; (iv) comparison of quality to raw material lots; (vi) automatic identification and notification of primary factors limiting performance; (vii) automatic identification and notification for conditions differing from typical operational conditions; (ix) predictive calculations for completion time and overall efficiency factor; (x) automatic notification to management structures for quality or food safety deviations; (xi) projection of OEE compared with standard operating conditions; (xii) totalized production and yield calculation; and (xiii) AI adjustment of operational parameters to improve system performance.

12. The system of claim 1, wherein said at least one industrial automation device is a plurality of commercial food production devices selected from the group consisting of mixers, handlers, loaders, marinators, cookers, coolers, and combinations thereof.

13. A method of collecting and correlating on-line and offline system operational data from a network-connected batch food production system, comprising:

providing and configuring at least one industrial automation device having equipment sensors disposed on and operatively coupled to the industrial automation device to obtain on-line data relating to a batch run; an Internet-enabled local controller in electronic communication with the equipment sensors; a cloud link connecting the Internet-enabled local controller with an Internet-based cloud platform; a central server in the cloud platform configured to receive data from the local controller and running a process historian software program having a time series database; and an Internet-enabled device configured to receive manually obtained time-stamped offline data relating to the batch run and to transmit the offline data to the central server independently of the Internet-enabled local controller through a VPN or Ethernet;

designing a recipe structure combining automatic and manual steps, using messaging systems;

detecting and collecting system data using the sensors, human observations, or a combination thereof;

processing the system data using the central server to output processing services information;

providing processing services including one or more of remote recipe editing and distribution; customized batch reporting for a plurality of customers at the completion of batch runs; dashboard generation for use by customers to review ongoing and historical batches; notifications across communication platforms, such as mobile, email, SMS and other notification systems; review of recipes and suggestions for improvement; anticipation of probable process time for a configured recipe to anticipate production time using historical and theoretical data sets; daily report generation summarizing runs and data relating to other non-batch related events; statistical comparison of steps with theoretical or observed data sets to determine outliers and their potential cause or causes; supply of data to a cloud service to assist customers in optimizing recipes for maximum throughput and quality; generation of emails to a cloud service, notifying a customer when a remote gateway has lost or gained connection to the network; generating messages to a designated user at a customer location based on alarm status, HACCP issues, or batch run status; sending data to customer assets to improve productivity; monitoring equipment wear, recommending equipment and parts replacement, and servicing of parts based on hours of use or other indicators; enabling a cloud service to share a customer's screen to assist the user and to recognize when the user experience needs improving; and using a gateway area network to update all remote gateways.

* * * * *